US008326281B2

(12) United States Patent  
Hill

(10) Patent No.: US 8,326,281 B2  
(45) Date of Patent: Dec. 4, 2012

(54) MOBILE WIRELESS COMMUNICATIONS DEVICE PROVIDING OBJECT REFERENCE DATA BASED UPON NEAR FIELD COMMUNICATION (NFC) AND RELATED METHODS

(75) Inventor: Thomas C. Hill, Crystal Lake, IL (US)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 13/028,517

(22) Filed: Feb. 16, 2011

(65) Prior Publication Data

US 2012/0208551 A1 Aug. 16, 2012

(51) Int. Cl.
*H04W 4/00* (2009.01)
*H04W 24/00* (2009.01)
(52) U.S. Cl. .................. 455/422.1; 455/456.1
(58) Field of Classification Search .................. 455/41.2,
455/456.1, 421, 414.1, 556.1, 550.1, 456.5;
348/231.3, 222.1, 208.99, 158, 231.2, 552
See application file for complete search history.

(56) References Cited

U.S. PATENT DOCUMENTS

| | | | | |
|---|---|---|---|---|
| 2003/0119494 | A1* | 6/2003 | Alanara et al. | 455/421 |
| 2005/0116945 | A1 | 6/2005 | Mochizuki et al. | 345/418 |
| 2005/0245271 | A1* | 11/2005 | Vesuna | 455/456.1 |
| 2008/0132167 | A1* | 6/2008 | Bent et al. | 455/41.2 |

FOREIGN PATENT DOCUMENTS

WO WO2010/148816 12/2010

OTHER PUBLICATIONS

NFC Museum: an Open-Source Middleware for Augmenting Museum Exhibits http://www.fp7-aspire.eu/fileadmin/aspire/docs/ICPS08-demo-NFCMuseum-cr.pdf : Printed Feb. 1, 2011.
Augmented Reality, Android, and RFID/ DASH 7 http://dash7.org/blog/?p=201: Printed Feb. 1, 2011.
An Open Letter to Nokia http://www.intomobile.com/2009/08/04/open_letter_nokia.html.
Emigh, Jqueline "Droids, iPhones, and RFID to drive new mobile shopping and transit apps in 2010" www.betanews.com/articie/droids-iphones—and RFID: printed Aug. 30, 2010.
"Augmented Reality" en.wikipedia.org/wiki/Augmented_reality: Printed Aug. 30, 2010.
All posts tagged augmented reality www.wired.com/dadgetlab/tab/augmented-reality/: Printed Aug. 30, 2010.

* cited by examiner

*Primary Examiner* — Kiet Doan
(74) *Attorney, Agent, or Firm* — Allen, Dyer, Doppelt, Milbrath & Gilchrist, P.A.

(57) ABSTRACT

A wireless communications system may include a near field communication (NFC) reference device configured to store object reference data for at least one object associated with a geographic location of the NFC device. The wireless communications system may also include a mobile wireless communications device that includes an NFC transceiver configured to communicate with the NFC device based upon proximity thereto, an image sensor, a display, and a controller. The controller may cooperate with the NFC transceiver, the image sensor, and the display. The controller may be configured to determine a sensed image from the image sensor. The controller may also be configured to select object reference data for the sensed image based upon communication with the NFC reference device, and display the object reference data and the sensed image on the display.

29 Claims, 8 Drawing Sheets

MOBILE WIRELESS COMMUNICATIONS DEVICE PROVIDING OBJECT REFERENCE DATA BASED UPON NEAR FIELD COMMUNICATION (NFC) AND RELATED METHODS

TECHNICAL FIELD

This application relates to the field of communications, and more particularly, to wireless communications systems and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the internet via a cellular network and/or a wireless local area network (WLAN), for example.

Some mobile devices incorporate contactless card technology and/or near field communication (NEC) chips. NEC technology is commonly used for contactless short-range communications based on radio frequency identification (RFID) standards, using magnetic field induction to enable communication between electronic devices, including mobile wireless communications devices. This short-range high frequency wireless communications technology exchanges data between devices over a short distance, such as only a few centimeters.

DETAILED DESCRIPTION

Figure 1:
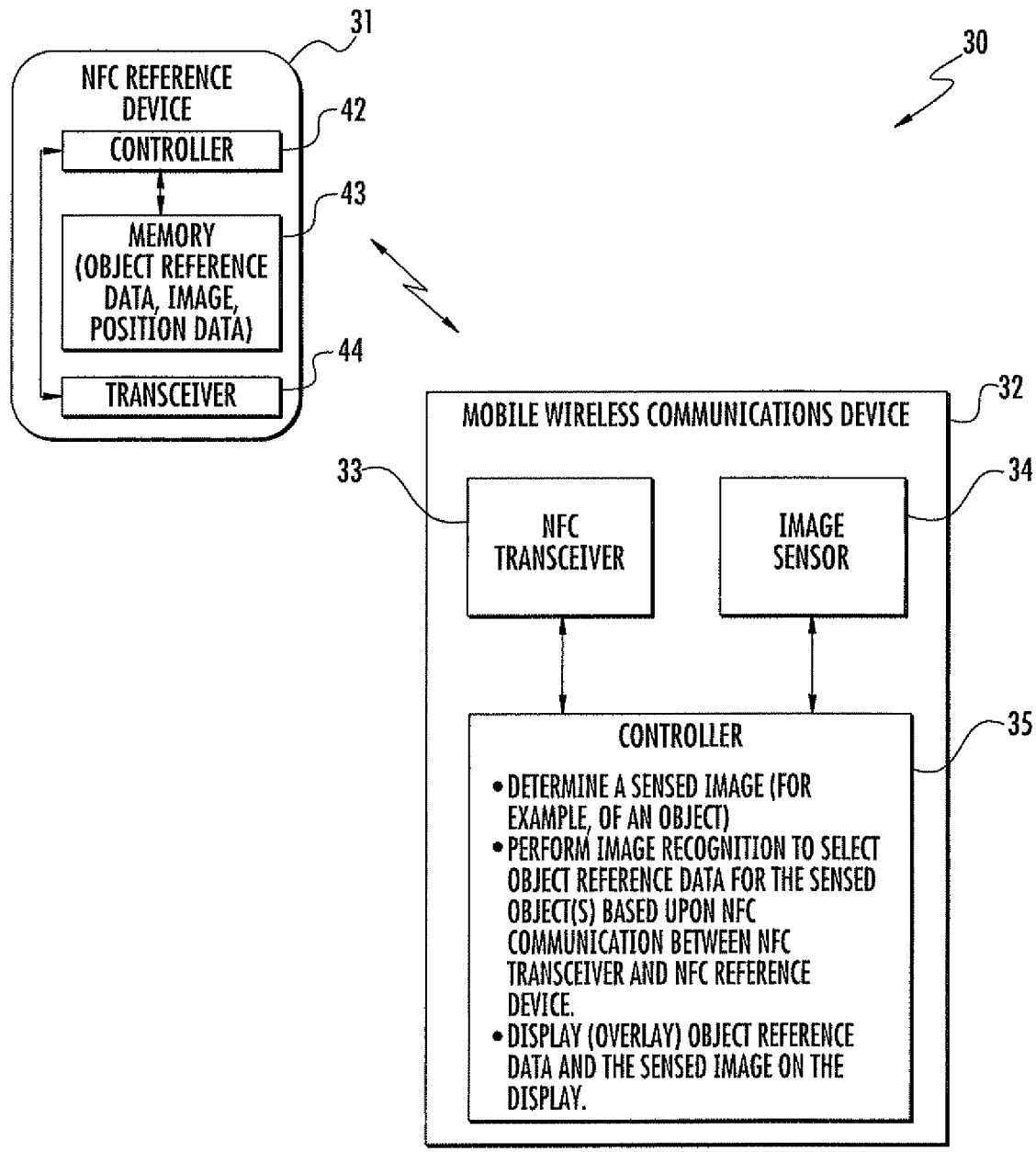
FIG. 1 is a schematic block diagram of a communications system in accordance with an example embodiment.

The present description is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Generally speaking, a wireless communication system is disclosed herein which may include a near field communication (NFC) reference device configured to store object reference data for at least one object associated with a geographic location of the NFC device. The wireless communications system may also include a mobile wireless communications device that includes an NFC transceiver configured to communicate with the NFC device based upon proximity thereto, an image sensor, a display, and a controller. The controller may cooperate with the NFC transceiver, the image sensor, and the display. The controller may be configured to determine a sensed image from the image sensor. The sensed image may have at least one sensed object therein, for example. The controller may also be configured to select object reference data for the at least one sensed object based upon communication with the NFC reference device, and display the object reference data and the sensed image on the display.

The NFC reference device may be configured to store at least one reference image, for example. The controller may be configured to select the object reference data based upon performing image recognition between the sensed image and the at least one reference image, for example.

The NFC reference device may be configured to store reference position data. The mobile wireless communications device may include a position determining device, for example. The controller may be configured to cooperate with the position determining device to select the object reference data based upon the stored reference position data and a position of the mobile wireless communications device. The controller may be configured to cooperate with the position determining device to generate an alert that the NFC reference device is nearby based upon a position of the mobile wireless communications device, for example.

The at least one sensed object may include a plurality of sensed objects. Each sensed object may have a category associated therewith from among a plurality of different categories, for example. The controller may be configured to select the object reference data based upon the different categories.

The controller may be configured to cooperate with the display to overlay the object reference data on the sensed image. The NFC reference device may include an NFC reference device transceiver, an NFC reference device memory, and an NFC reference device controller coupled to the NFC reference device transceiver and NFC reference device memory.

A mobile wireless communications device, similar to the one described briefly above, and a related communications method are also provided. The method may include determining a sensed image from the image sensor. The sensed image may have at least one sensed object therein. The method may also include selecting object reference data for the at least one sensed object based upon communication with an NFC reference device configured to communicate with the NFC transceiver based upon proximity thereto. The NFC reference device may be configured to store object reference data for at least one object associated with a geographic location of the NFC reference device. The method also includes displaying the object reference data and the sensed image on the display.

A related non-transitory computer-readable medium for use with a mobile wireless communications device, such as the one described briefly above, may have computer-executable instructions for causing the mobile wireless communications device to perform various steps. The steps may include determining a sensed image from the image sensor. The sensed image may have at least one sensed object therein. The steps may also include selecting object reference data for the at least one sensed object based upon communication with an NFC reference device configured to communicate with the NFC transceiver based upon proximity thereto, for example. The NFC reference device may be configured to store object reference data for at least one object associated with a geographic location of the NFC reference device. The steps may also include displaying the object reference data and the sensed image on the display, for example.

Figure 2:
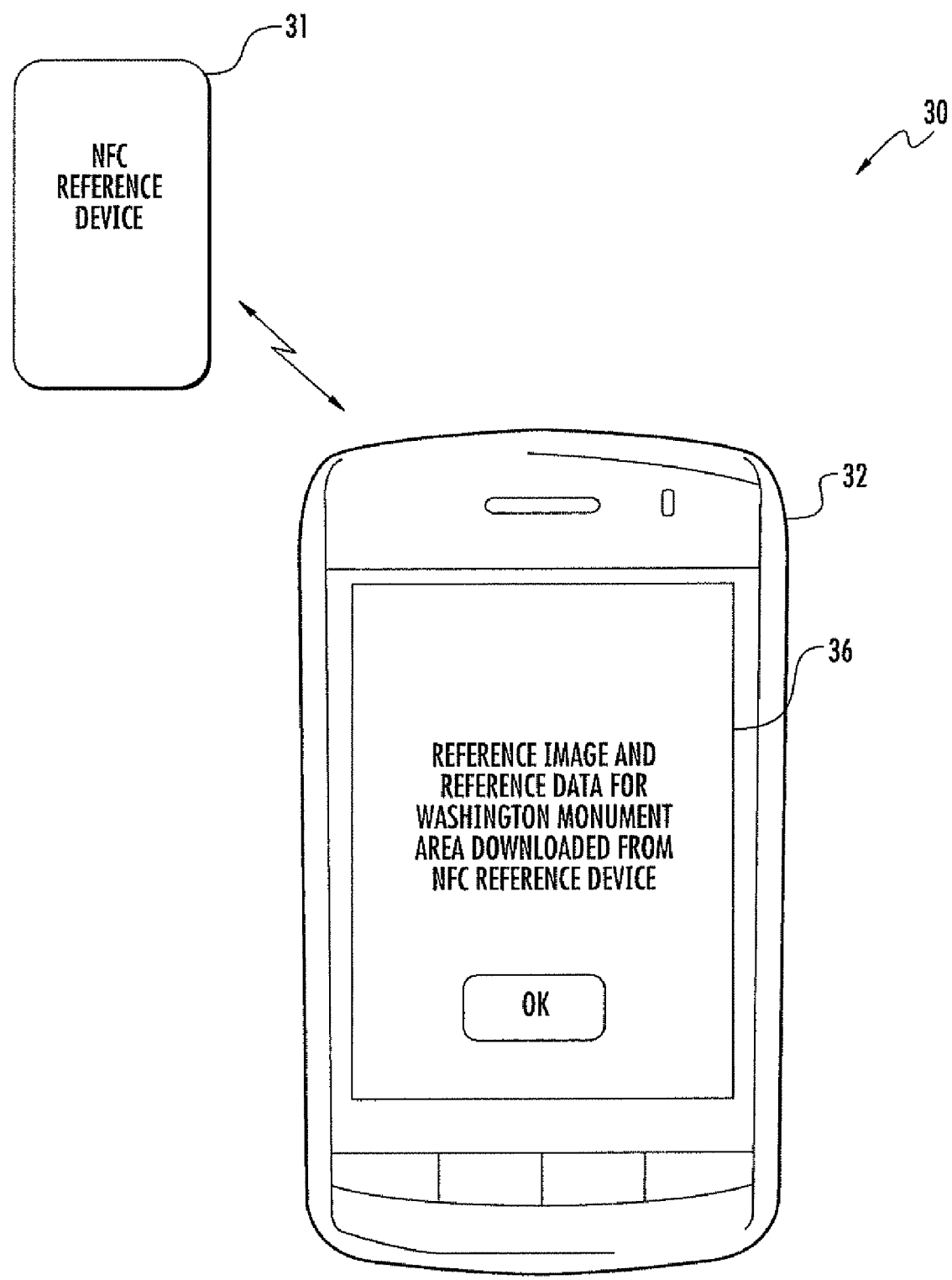
FIG. 2 is another schematic block diagram of the communications system of FIG. 1 including the display of the mobile device.
Figure 3:
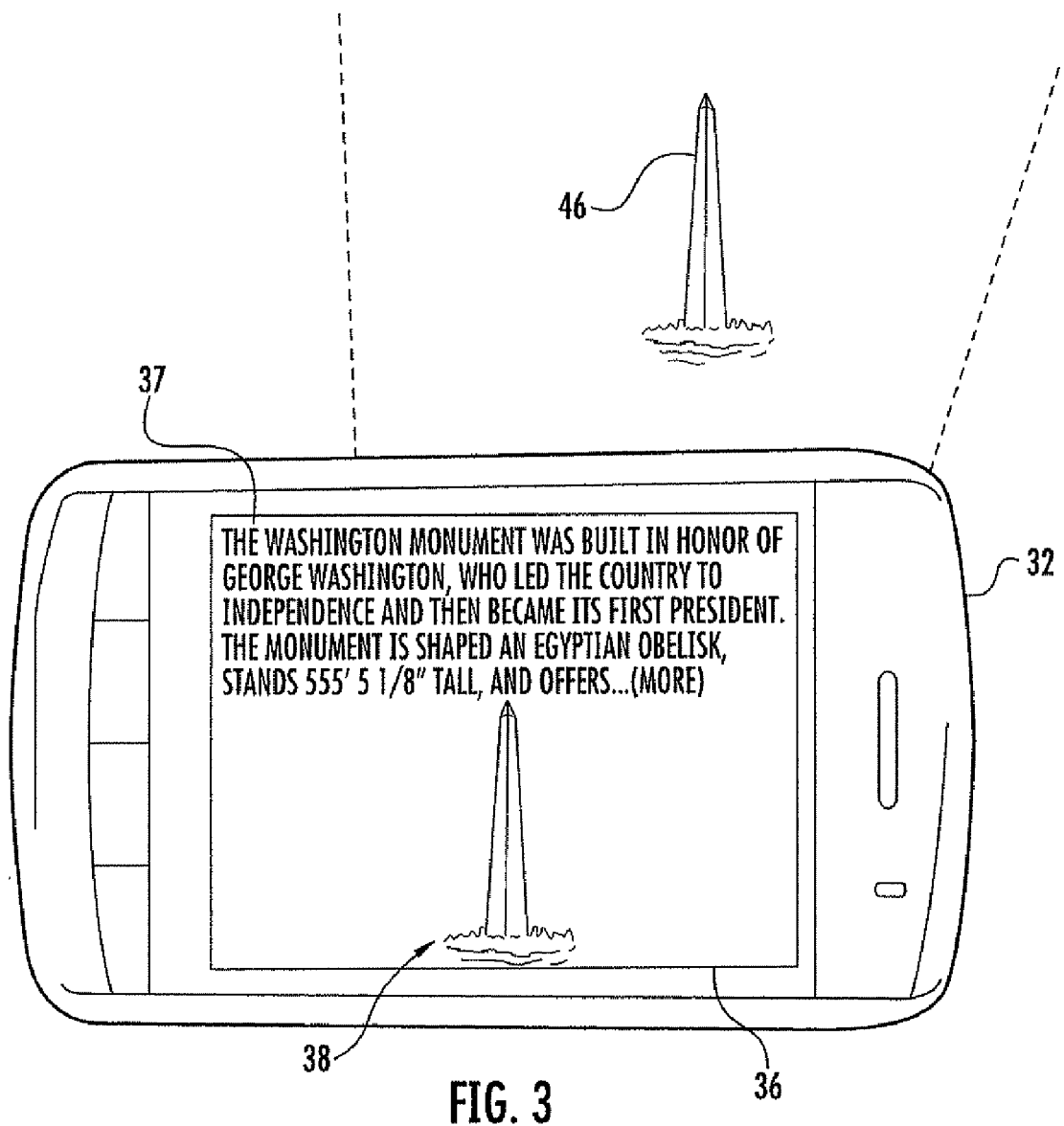
FIG. 3 is a schematic view of the mobile device of the system of FIG. 1 providing object reference data based upon a sensed image of a monument.

Referring initially to FIGS. 1-3, a communications system 30 is first described. The system 30 illustratively includes a near field communication (NFC) reference device 31 configured to store object reference data for an object associated with a geographic location, and a mobile wireless communications device 32 (also referred to as a "mobile device" herein). Example mobile wireless communications devices may include portable or personal media players (e.g., music or MP3 players, video players, etc.), portable gaming devices, portable or mobile telephones, smartphones, tablet computers, digital cameras, etc.

By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication which may have different operating frequencies, effective ranges, etc., for example, may also be used.

The NFC reference device 31 includes a NFC reference device transceiver 44, an NFC reference device memory 43, and a NFC reference device controller 42 coupled to the NFC reference device transceiver and NFC reference device memory. In one example embodiment, the NFC reference device memory 43 is configured to store reference images for objects geographically near the NFC reference device 31. In particular, the NFC reference device 31 may store reference images for objects within a threshold geographic radius of the NFC reference device.

The mobile device 32 illustratively includes an NFC transceiver 33 configured to communicate with the NFC reference device 31 based upon proximity thereto using NFC communication, an image sensor 34, a display 36, and a controller 35 coupled to the NFC transceiver, the image sensor, and the display. By way of example, the image sensor 34 may comprise one or more digital camera or image capture components, such as a lens, a charge-coupled device (CCD), etc. The controller 35 may be implemented using hardware (e.g., processor, memory, etc.) and software components, i.e., computer-readable instructions for causing the mobile device 32 to perform the various functions or operations described herein. The NFC reference device 31 may be an NEC tag, an NFC-enabled mobile device, etc.

One or more of the stored reference images from the NFC reference device memory 43 may be communicated from the NFC reference device 31 via the NFC reference device transceiver 44 and the NFC transceiver 33. Successful download of stored reference images and the object reference data may be optionally indicated by way of the display 36. (FIG. 2).

The controller 35 is configured to determine a sensed image 38 from the image sensor 34. For example, the controller may cause the image sensor 34 to capture a single image or a continuous stream of images, as in the case with taking a digital picture or a digital video. In the example of FIG. 3, an object 46, for example, a monument is in the field of view or viewfinder of the mobile device 32, and the image 38 captured by its image sensor (e.g., camera) is displayed on the display 36. The sensed image 38 may include other or additional objects.

The controller 35 is configured to select the corresponding object reference data based upon performing image recognition between the sensed image 38 from the image sensor 34 and the received stored reference images. In the illustrated example, the sensed image 38 includes an object 46, in particular, the Washington Monument. In some embodiments, the sensed image 38 may not have an object therein or visible on the display 36. For example, the object may be behind trees, and thus may not be visible on the display 36. A stored reference image or images may be received from an NFC reference device 31 nearby the Washington Monument, and may also include object reference data 37, for example, historical data, relating thereto. The controller 35, by performing image recognition, may identify the Washington Monument 46 in the sensed image 38. The controller 35 may be configured to display the object reference data 37 and the sensed image 38 on the display 36. More particularly, the controller 35 may advantageously be configured to overlay the object reference data 37 at least partially over the sensed image 38 as augmented reality (AR) data. In some example embodiments, the controller 35 may display the reference data 37 alongside the sensed image 38. The controller 35 may be configured to display the reference image data and the sensed image 38 in other configurations.

Additionally, while the controller 35 advantageously receives stored reference images from the NEC reference device 31, in other example embodiments (not shown), the controller may communicate the sensed image 38 to the NEC reference device, wherein the NEC reference device controller 42 may perform the image recognition. The NEC reference device controller 42 may select the corresponding object reference data and communicate the same to the controller 35 for displaying with the sensed image 38. Referring to the Washington Monument example, the object reference data 37 may include the height, name of the monument, the date it was built, etc.

Each sensed object 46 advantageously has a category associated therewith. For example, the Washington Monument 46 may be associated with categories, such as, for example, historical structures, and "vacation." A sensed object 46 may be associated with various categories, and may be user-defined or have pre-defined default category associations, for example. The controller 35 may be configured to select the object reference data 37 based upon the different categories. More particularly, in a "vacation mode," for example, the controller 35 may select object reference data associated with the vacation category. In a "business mode," for example, the controller 35 may select and display object reference data associated with business, for example, subway entrances, coffee shops, etc., and not select and display object reference data for tourist attractions, such as the Washington Monument. The controller 35 may also select the object reference data 37 based upon priority or ranking, which may be user-defined or set by a user-profile, for example.

Indeed, receiving object reference data 37 from the NFC reference device 31 may be particularly advantageous as it provides augmented reality while reducing the amount of data traffic that would otherwise be present on a cellular network if many users are located in a common area and attempting to simultaneously access such information, for example. This may also decrease power consumption for the mobile device, and thereby increase battery life.

Figure 4:
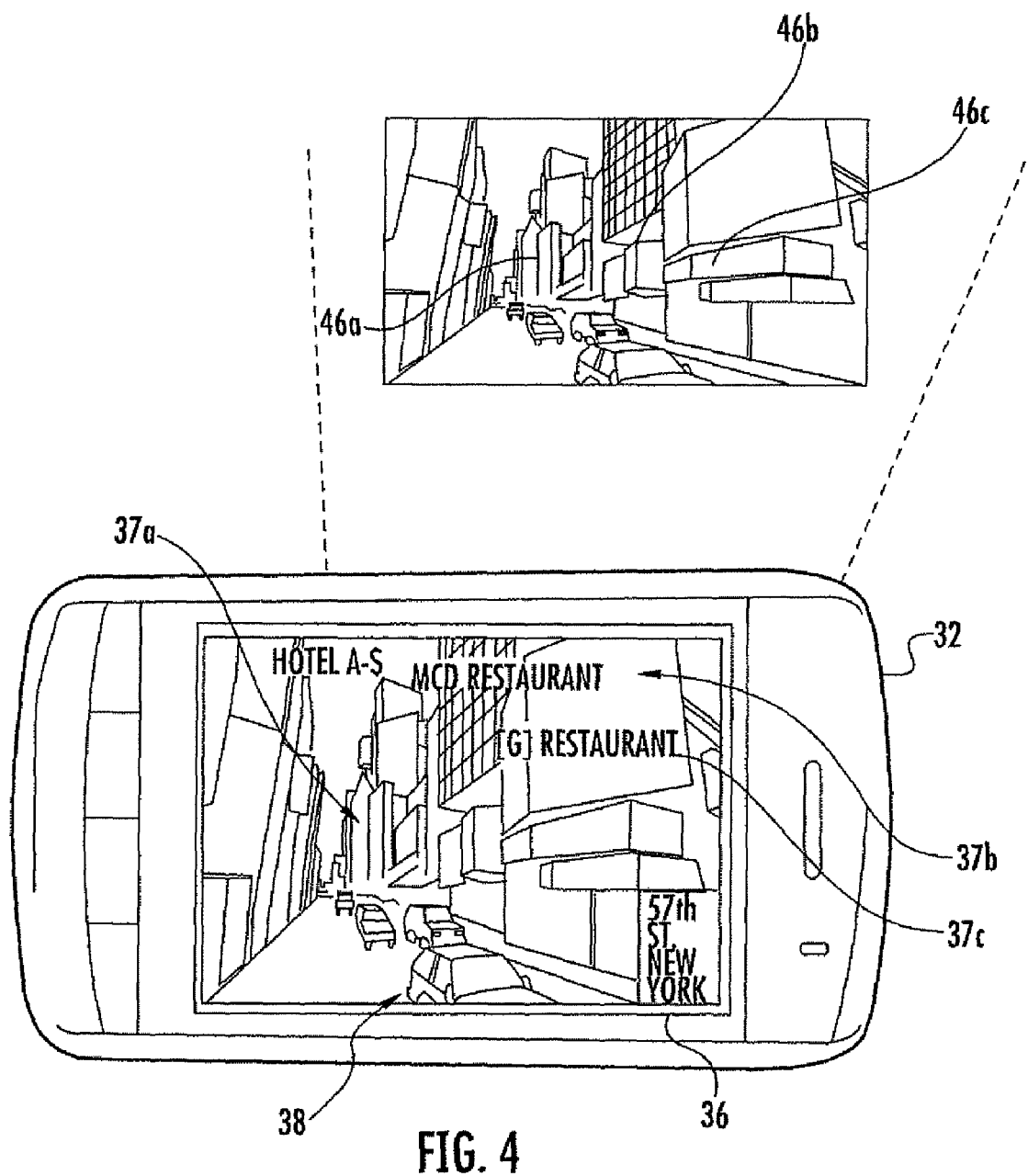
FIG. 4 is a schematic view of the mobile device of the system of FIG. 1 providing object reference data based upon a sensed image of a street.

Referring now to the example of FIG. 4, the sensed image 38 includes more than one object. More particularly, the sensed image 38 is a view down a street. Several objects 46a-46c, for example, two restaurants and a hotel, are in the field of view or viewfinder of the mobile device 32, and the image 38 captured by its image sensor (e.g., camera) is displayed on the display 36. The sensed image 38 illustratively includes other or additional objects.

The controller 35 selects the corresponding object reference data. The controller 35 may select the corresponding object reference data based upon selected categories, as described above. In the illustrated example, object reference data associated with hotels (i.e. lodging) and restaurants, for example, is overlaid over the sensed image 38 as AR data. In particular, object reference data 37a identifying the object 46a as "Hotel A" and a price guide (i.e. a price range as indicated by a given number of dollar signs) are overlaid over the sensed image 38 as AR data. Similar object reference data 37b, 37c identifying the objects 46b, 46c and price guide for the "MCD" and "TGI" restaurants, respectively, are also overlaid over the sensed image 38 as AR data. Additional information identifying other objects may be displayed based upon selected categories, for example.

Figure 5:
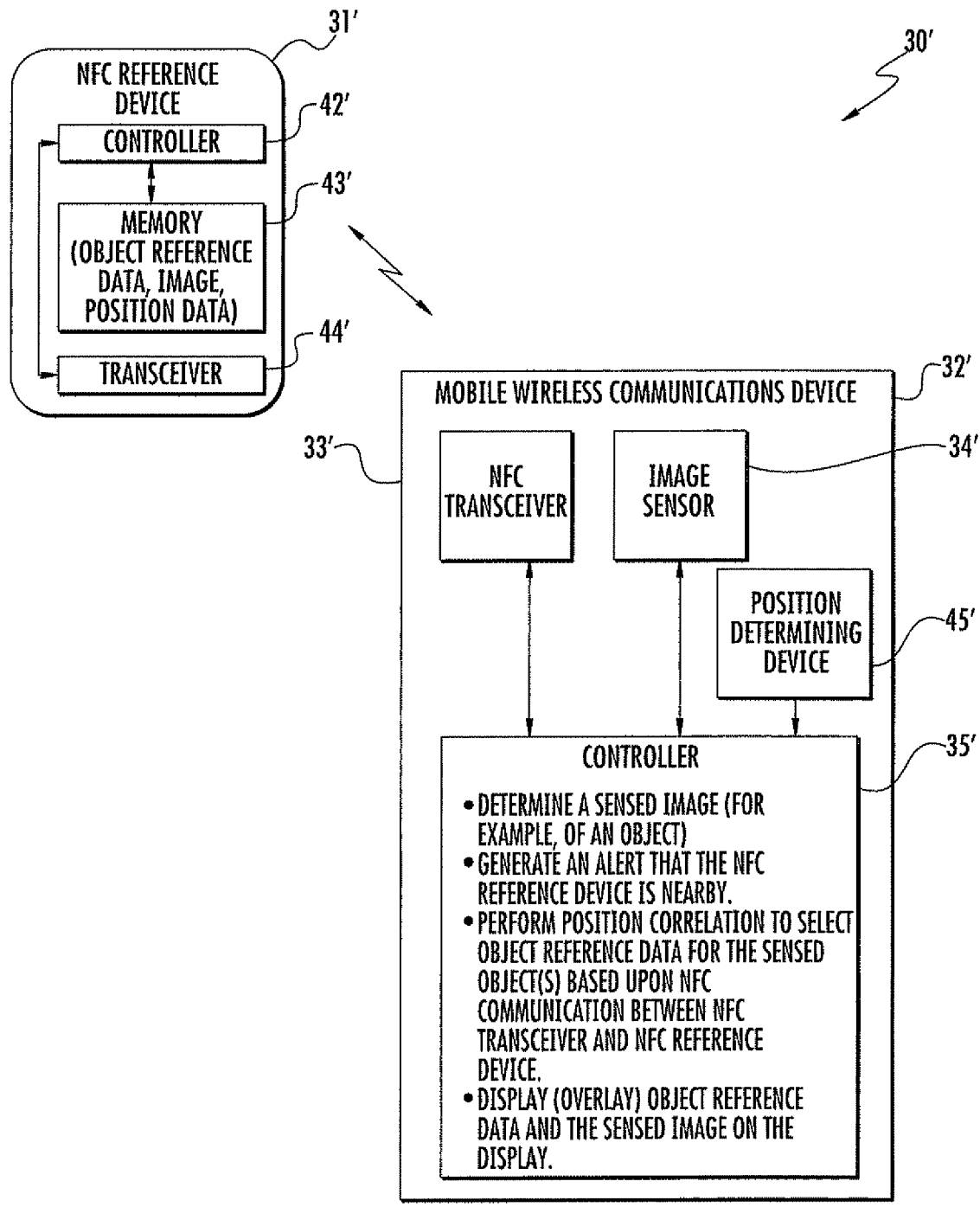
FIG. 5 is a schematic block diagram of a communications system in accordance with another example embodiment.

Referring now to FIG. 5, in another example embodiment, the NFC reference device memory 43' may be configured to store reference position data corresponding to objects geographically near the NFC reference device 31'. Similarly, the NFC reference device 31' may store reference images for objects within a threshold geographic radius of the NFC reference device.

The mobile device 32' also includes a position determining device 45' configured to determine a geographical position. For example, the position determining device 45' may comprise a global positioning system (GPS) receiver. More than one position determining device may be used. For example, the GPS receiver 45' may cooperate with a bearing or heading determining device, such as a compass, for example, to determine the geographical position of what is in the field of view or viewfinder of the image sensor 34'. As such, image comparison and recognition, as described above, need not be used, although either technique (or both) may be used in a given embodiment.

The controller 35' may also be configured to cooperate with the position determining device 45' to generate an alert that the NFC reference device 31' is nearby based upon the position of the mobile device 31'. In particular, the mobile device 31' may sound an audible alert, vibrate, or generate another type of alert when the mobile device is within a threshold geographical area as determined by the position determining device 45'.

The object reference data 37' for an object 46' associated with the geographic location of the NFC reference device 31' may include historical information, schedules or hours of operation, or any other information that may be associated with an object. The object 46' may be a structure, for example, a statue, a monument, a shelter, and a building, but it will be appreciated that the object may be another type of object.

Figure 7:
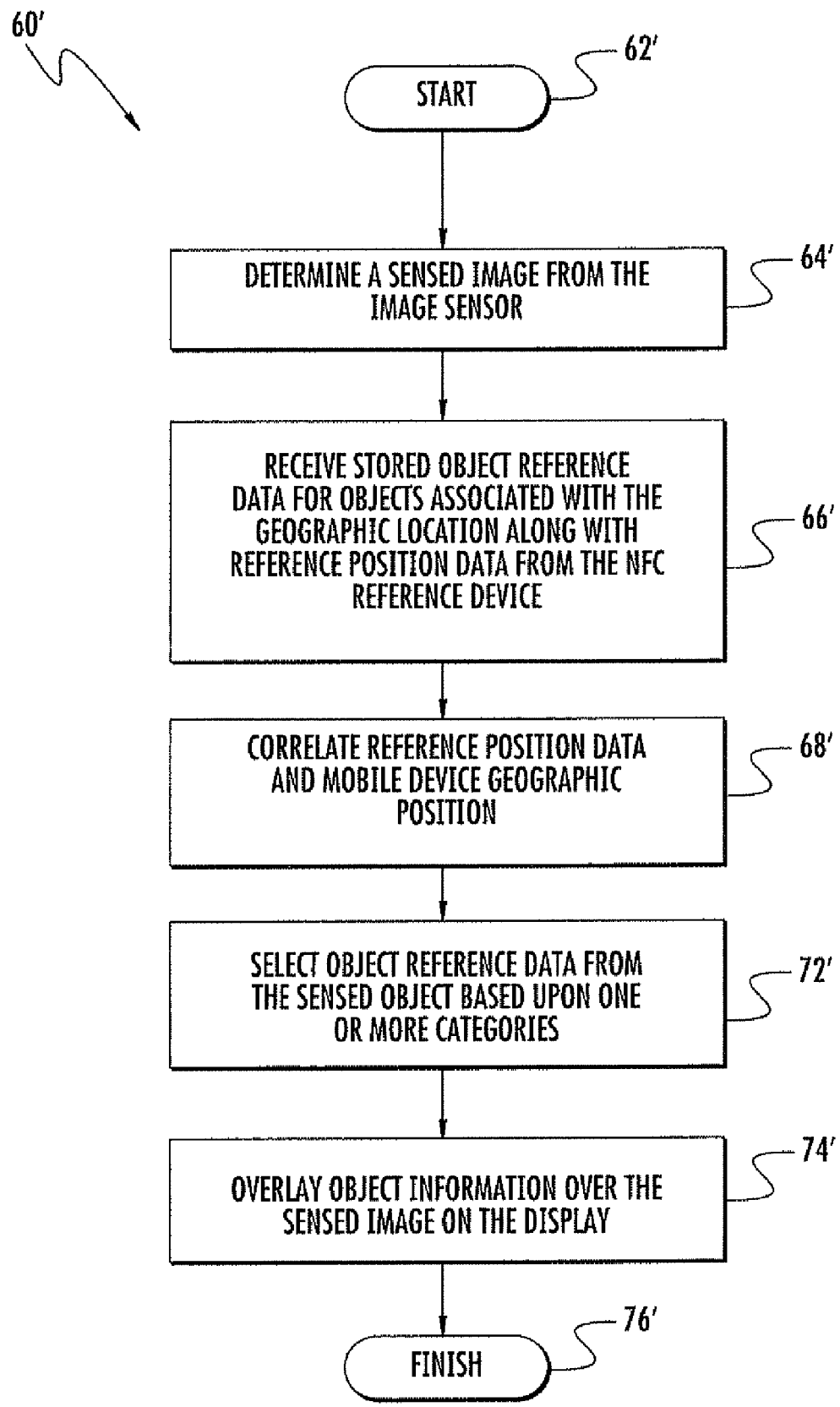
FIG. 7 is a flow diagram illustrating example method aspects associated with the system and devices of FIG. 5.

Referring to the flow diagram 60 in FIG. 7, an example method aspect is now described. Beginning at Block 62, the method includes determining a sensed image 38 from the image sensor 34 (Block 64). The sensed image 38 has sensed objects therein 46. In other embodiments, the sensed image 38 may not have a sensed object therein. The method further includes, at Block 66, receiving stored object reference data for objects associated with the geographic location along with reference images from the NFC reference device 31. At Block 68, the method includes performing image recognition between the sensed image and the reference image. At Block 72, the method includes selecting object reference data for the sensed object based upon one or more categories. The object reference data 37, is overlaid on the sensed image 38 on the display 36 at Block 74. The method ends at Block 76.

Figure 6:
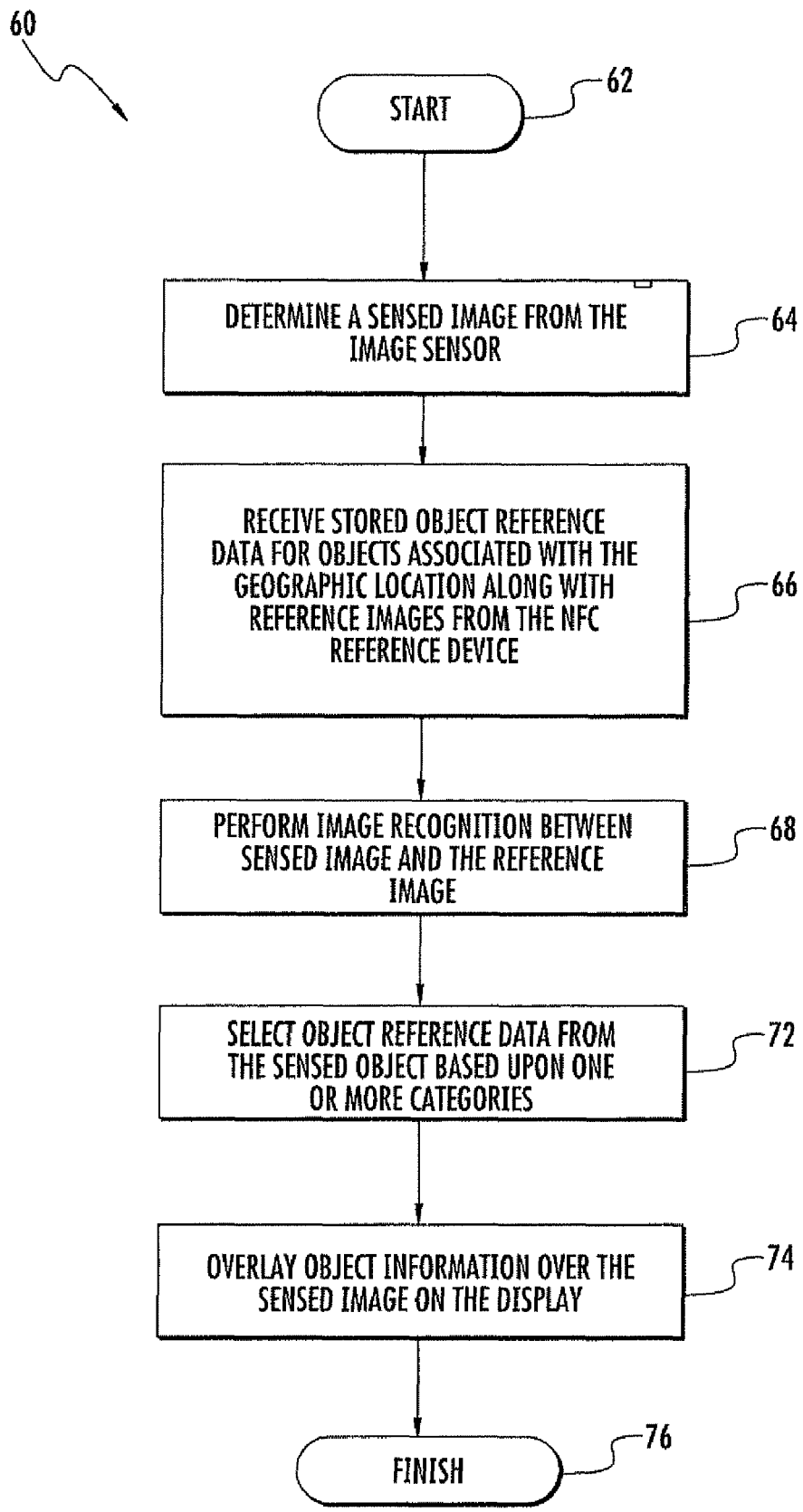
FIG. 6 is a flow diagram illustrating example method aspects associated with the system and devices of FIGS. 1-4.

Referring now to the flow diagram 60' in FIG. 6, a method aspect is disclosed. Beginning at Block 62', the method includes determining a sensed image 38' from the image sensor 34' (Block 64'). The sensed image 38' has sensed objects therein 37'. The method further includes, at Block 66', receiving stored object reference data for objects associated with the geographic location along with reference position data from the NFC reference device 31'. At Block 68', the method includes correlating the reference position data and geographic position of the mobile device 32' determined from a position determining device 45'. At Block 72', the method includes selecting object reference data for the sensed object 46' based upon one or more categories. The reference data 37' is overlaid on the sensed image 38' on the display 36' at Block 74'. The method ends at Block 76'.

Example components of a mobile wireless communications device 1000 that may be used in accordance with the above-described embodiments are further described below with reference to FIG. 8. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 8:
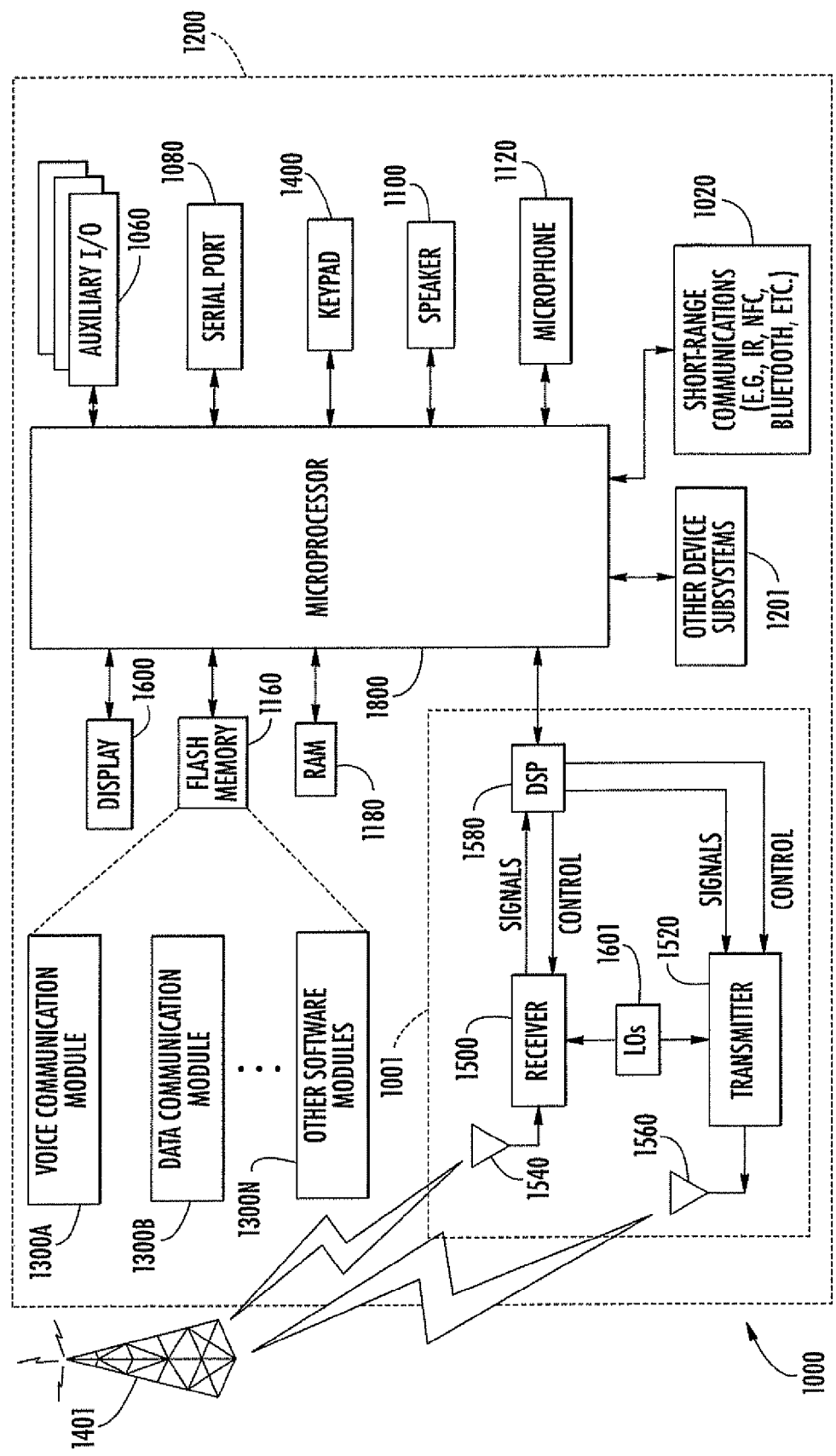
FIG. 8 is a schematic block diagram illustrating example components of a mobile wireless communications device that may be used in accordance with various implementations.

In addition to the processing device 1800, other parts of the mobile device 1000 are shown schematically in FIG. 8. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TACT™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) sensor for communicating with a NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A wireless communications system comprising:
   a near field communication (NEC) reference device configured to store object reference data for at least one object associated with a geographic location of said reference NEC device; and
   a mobile wireless communications device comprising
      an NEC transceiver configured to communicate with said NEC reference device based upon proximity thereto,
      an image sensor,
      a display, and
      a controller cooperating with said NEC transceiver, said image sensor, and said display and configured to
         determine a sensed image from said image sensor,
         select object reference data for the sensed image based upon communication with said NFC reference device, and
         display the object reference data and said sensed image on said display.

2. The system of claim 1 wherein the NFC reference device is configured to store at least one reference image; and wherein said controller is configured to select the object reference data based upon performing image recognition between the sensed image and the at least one reference image.

3. The system of claim 1 wherein the NFC reference device is configured to store reference position data; wherein said mobile wireless communications device comprises a position determining device; and wherein said controller is configured to cooperate with said position determining device to select the object reference data based upon the stored reference position data and a position of said mobile wireless communications device.

4. The system of claim 1 wherein said mobile wireless communications device further comprises a position determining device; and wherein said controller is configured to cooperate with said position determining device to generate an alert that said NFC reference device is nearby based upon a position of said mobile wireless communications device.

5. The system of claim 1 wherein the sensed image has at least one sensed object therein, and wherein said controller is configured to select object reference data for the at least one sensed object based upon communication with said NFC reference device.

6. The system of claim 5 wherein the at least one sensed object comprises a plurality of sensed objects, each sensed object having a category associated therewith from among a plurality of different categories; and wherein said controller is configured to select the object reference data based upon the different categories.

7. The system of claim 1 wherein said controller is configured to cooperate with said display to overlay the object reference data on said sensed image.

8. The system of claim 1 wherein said NFC reference device comprises:
an NFC reference device transceiver;
an NFC reference device memory; and
an NFC reference device controller coupled to said NEC reference device transceiver and NFC reference device memory.

9. A mobile wireless communications device comprising:
a near field communication (NFC) transceiver
an image sensor;
a display; and
a controller cooperating with said NFC transceiver, said image sensor, and said display and configured to
receive an image from said image sensor, the image including an object,
receive data corresponding to the object via the NFC transceiver, and
concurrently display the image and the data corresponding to the object in the image on said display.

10. The mobile wireless communications device of claim 9 wherein said controller is configured to select the object reference data based upon performing image recognition between the sensed image and at least one reference image.

11. The mobile wireless communications device of claim 9 further comprising a position determining device; and wherein said controller is configured to cooperate with said position determining device to select the object reference data based upon stored reference position data and a position of said mobile wireless communications device.

12. The mobile wireless communications device of claim 9 wherein said mobile wireless communications device further comprises a position determining device; and wherein said controller is configured to cooperate with said position determining device to generate an alert based upon a position of said mobile wireless communications device.

13. The mobile wireless communications device of claim 9 wherein said controller is configured to select object reference data for the object based upon NFC communication.

14. The mobile wireless communications device of claim 13 wherein the object has a category associated therewith from among a plurality of different categories; and wherein said controller is configured to select the object reference data based upon the associated category.

15. The mobile wireless communications device of claim 9 wherein said controller is configured to cooperate with said display to overlay the object reference data on the image.

16. A method of using a mobile wireless communications device comprising an NFC transceiver, an image sensor, and a display, the method comprising:
determining a sensed image from the image sensor,
selecting object reference data for the sensed image based upon communication with an NFC reference device configured to communicate with the NFC transceiver based upon proximity thereto, the NFC reference device being configured to store object reference data for at least one object associated with a geographic location of the NFC reference device, and
displaying the object reference data and the sensed image on the display.

17. The method of claim 16 wherein the NFC reference device is configured to store at least one reference image; and further comprising performing image recognition between the sensed image and the at least one reference image to select the object reference data.

18. The method of claim 16 wherein the NFC reference device is configured to store reference position data; wherein the mobile wireless communications device comprises a position determining device; and further comprising cooperating with the position determining device to select the object reference data based upon the stored reference position data and a position of the mobile wireless communications device.

19. The method of claim 16 wherein further comprising generating an alert that the NFC reference device is nearby based upon a position of the mobile wireless communications device from a position determining device.

20. The method of claim 16 wherein the sensed image has at least one sensed object therein, and wherein selecting the object reference data comprises selecting the object reference data for the at least one sensed object based upon communication with the NFC reference device.

21. The method of claim 16 wherein the at least one sensed object comprises a plurality of sensed objects, each sensed object having a category associated therewith from among a plurality of different categories; and further comprising selecting the object reference data based upon the different categories.

22. The method of claim 16 wherein displaying the object reference data and the sensed image on the display comprises overlaying the object reference data on the sensed image.

23. A non-transitory computer-readable medium for use with a mobile wireless communications device comprising an NFC transceiver, an image sensor, and a display, and having computer-readable instructions for causing the mobile wireless communications device to perform the steps comprising:
determining a sensed image from the image sensor;
selecting object reference data for the sensed image based upon communication with an NFC reference device configured to communicate with the NEC transceiver based upon proximity thereto, the NFC reference device being configured to store object reference data for at least one object associated with a geographic location of the NFC reference device; and
displaying the object reference data and the sensed image on the display.

24. The non-transitory computer-readable medium of claim 23 wherein the NEC reference device is configured to store at least one reference image; and further having computer-executable instructions for causing the mobile wireless communications device to perform a step comprising selecting the object reference data based upon performing image recognition between the sensed image and the at least one reference image.

25. The non-transitory computer-readable medium of claim 23 wherein the NFC reference device is configured to store reference position data; wherein the mobile wireless communications device comprises a position determining device; and further having computer-executable instructions for causing the mobile wireless communications device to perform a step comprising cooperating with the position determining device to select the object reference data based upon the stored reference position data and a position of the mobile wireless communications device.

26. The non-transitory computer-readable medium of claim 23 wherein the mobile wireless communications device further comprises a position determining device; and further having computer-executable instructions for causing the mobile wireless communications device to perform a step comprising cooperating with the position determining device to generate an alert that the NFC reference device is nearby based upon a position of the mobile wireless communications device.

27. The non-transitory computer-readable medium of claim 23 wherein the sensed image has at least one sensed object therein, and wherein the computer-executable instructions are for selecting the object reference data for the at least one sensed object based upon communication with the NFC reference device.

28. The non-transitory computer-readable medium of claim 27 wherein the at least one sensed object comprises a plurality of sensed objects, each sensed object having a category associated therewith from among a plurality of different categories; and further having computer-executable instructions for causing the mobile wireless communications device to perform a step comprising selecting the object reference data based upon the different categories.

29. The non-transitory computer-readable medium of claim 23 further having computer-executable instructions for causing the mobile wireless communications device to perform a step comprising overlaying the object reference data on the sensed image.

* * * * *

UNITED STATES PATENT AND TRADEMARK OFFICE
CERTIFICATE OF CORRECTION

PATENT NO. : 8,326,281 B2
APPLICATION NO. : 13/028517
DATED : December 4, 2012
INVENTOR(S) : Thomas C. Hill It is certified that error appears in the above-identified patent and that said Letters Patent is hereby corrected as shown below:

Column 1, Line 27    Delete: "(NEC) chips"
                     Insert: --(NFC) chips--

Column 1, Line 27    Delete: "NEC technology"
                     Insert: --NFC technology--

Column 3, Line 54    Delete: "an NEC tag"
                     Insert: --an NFC tag--

Column 4, Line 31    Delete: "NEC reference"
                     Insert: --NFC reference--

Column 4, Line 33    Delete: "image 38 to the NEC"
                     Insert: --image 38 to the NFC--

Column 4, Line 34    Delete: "wherein the NEC reference"
                     Insert: --wherein the NFC reference--

Column 4, Line 35    Delete: "recognition. The NEC"
                     Insert: --recognition. The NFC--

Column 8, Line 36    Delete: "communication NEC reference"
                     Insert: --communication NFC reference--

Column 8, Line 39    Delete: "reference NEC device"
                     Insert: --reference NFC device--

Column 8, Line 41    Delete: "an NEC transceiver"
                     Insert: --an NFC transceiver--

Signed and Sealed this
Fifth Day of February, 2013

Teresa Stanek Rea
*Acting Director of the United States Patent and Trademark Office*

CERTIFICATE OF CORRECTION (continued)
U.S. Pat. No. 8,326,281 B2

| | |
|---|---|
| Column 8, Line 42 | Delete: "said NEC reference"<br>Insert: --said NFC reference-- |
| Column 8, Line 46 | Delete: "said NEC transceiver"<br>Insert: --the NFC transceiver-- |
| Column 9, Line 26 | Delete: "to said NEC"<br>Insert: --to said NFC-- |
| Column 10, Line 53 | Delete: "the NEC transceiver"<br>Insert: --the NFC transceiver-- |
| Column 10, Line 61 | Delete: "the NEC reference"<br>Insert: --the NFC reference-- |